(12) United States Patent
Silverbrook

(10) Patent No.: US 7,726,805 B2
(45) Date of Patent: Jun. 1, 2010

(54) PRINTING UNIT INCORPORATING A REPLACEABLE MEDIA SUPPLY CARTRIDGE LOCATED BETWEEN A CONNECTOR AND A PRINT HEAD ASSEMBLY

(75) Inventor: Kia Silverbrook, Balmain (AU)

(73) Assignee: Silverbrook Research Pty Ltd, Balmain, New South Wales (AU)

(*) Notice: Subject to any disclaimer, the term of this patent is extended or adjusted under 35 U.S.C. 154(b) by 470 days.

(21) Appl. No.: 11/838,878

(22) Filed: Aug. 14, 2007

(65) Prior Publication Data
US 2007/0296794 A1 Dec. 27, 2007

Related U.S. Application Data

(63) Continuation of application No. 11/378,342, filed on Mar. 20, 2006, now Pat. No. 7,271,829, which is a continuation of application No. 11/124,042, filed on May 9, 2005, now Pat. No. 7,014,307, which is a continuation of application No. 09/942,601, filed on Aug. 31, 2001, now Pat. No. 6,906,778, which is a continuation-in-part of application No. 09/436,750, filed on Nov. 9, 1999, now Pat. No. 6,539,180.

(30) Foreign Application Priority Data

Nov. 9, 1998 (AU) .................................... PP7017

(51) Int. Cl.
*H04N 5/257* (2006.01)
(52) U.S. Cl. ........................................................ 347/108
(58) Field of Classification Search ...................... 347/1, 347/2, 20, 108, 109
See application file for complete search history.

(56) References Cited

U.S. PATENT DOCUMENTS

| | | | | | |
|---|---|---|---|---|---|
| 4,904,100 | A | * | 2/1990 | Enix | 400/613 |
| 6,007,195 | A | * | 12/1999 | Kokubo | 347/108 |
| 6,069,711 | A | * | 5/2000 | Iwata | 358/400 |
| 6,149,256 | A | * | 11/2000 | McIntyre et al. | 347/2 |

* cited by examiner

*Primary Examiner*—Anh T. N. Vo

(57) ABSTRACT

A printing unit includes a support structure. The support structure includes a body portion with a tray positioned at one end of the body portion and a connector positioned at an opposing end of the body portion. A media supply cartridge is mounted on the body portion and is suitable for storing a stack of print media. A feed arrangement is mounted on the body portion and is configured to feed print media from the stack for printing. A print head assembly is mounted on the tray and is configured to print upon the fed print media.

8 Claims, 11 Drawing Sheets

PRINTING UNIT INCORPORATING A REPLACEABLE MEDIA SUPPLY CARTRIDGE LOCATED BETWEEN A CONNECTOR AND A PRINT HEAD ASSEMBLY

CROSS REFERENCE TO RELATED APPLICATION

The present application is a Continuation of U.S. application Ser. No. 11/378,342, filed Mar. 20, 2006, which is a Continuation of U.S. application Ser. No. 11/124,042, filed May 9, 2005, now issued U.S. Pat. No. 7,014,307, which is a Continuation of Ser. No. 09/942,601, filed 31 Aug. 2001, now issued as U.S. Pat. No. 6,906,778, which is a Continuation In Part of U.S. application Ser. No. 09/436,750, filed on Nov. 9, 1999, now issued as U.S. Pat. No. 6,539,180, the entire contents of which are herein incorporated by reference.

REFERENCED U.S. PATENTS/PATENT APPLICATIONS

This application is a continuation-in-part application of U.S. patent application Ser. No. 09/435,750. U.S. patent application Ser. Nos. 09/436,509, 09/436,750, 09,113,053, 09/425,419 and 09/922,105 are hereby incorporated by reference.

INVENTOR

Kia Silverbrook

STATEMENT REGARDING FEDERALLY SPONSORED RESEARCH OR DEVELOPMENT

Not applicable.

FIELD OF THE INVENTION

This invention relates to an image recordal and generation apparatus.

BACKGROUND OF THE INVENTION

The Applicant has developed print head assemblies that are capable of generating images having a resolution of up to 1600 dpi. Furthermore, the print head assemblies that the Applicant has developed are of a relatively small size, allowing them to be incorporated into a camera-based device such as that described in U.S. patent application Ser. No. 09/113,053.

Details of such a print head assembly can be found in U.S. patent application Ser. No. 09/113,053. The relatively small size has been largely the result of the development of an ink jet print head that is the subject of U.S. patent application Ser. No. 09/425,419.

The ink jet print head has allowed the Applicant to develop a compact portable printer that is directly engageable with a PCMCIA slot in a laptop or notebook computer.

This compact portable printer is the subject matter of the above referenced U.S. patent application Ser. No. 09/436,509.

The Applicant has identified that it would be highly desirable to provide an image recordal and generation assembly or apparatus that is capable of generating the high-resolution images mentioned above and yet is of a size that is comparable to pocket sized cameras that are presently available.

SUMMARY OF THE INVENTION

According to one aspect of the invention, there is provided a printing unit arranged to cooperate with an image recordal apparatus so as to form an apparatus for recording and generating images, the printing unit comprising:
  a carrier dimensioned to approximate a PCMCIA memory card, a media supply being receivable in the carrier;
  a page width print head assembly that is mounted in the carrier to print images on the media, the page width print head assembly including at least one print head chip and a suitable printing microprocessor that is configured to control operation of the print head chip;
  a media feed mechanism positioned in the carrier to feed media to and from the print head chip; and
  an ink distribution arrangement including an ink storage and feed structure that is in fluid communication with a channeling structure, the ink storage and feed structure including at least one outer ink reservoir and a plurality of ink storage channels, the channeling structure including a plurality of feed channels, each feed channel being in fluid communication with a storage channel and at least one nozzle of the printhead chip so that ink can be fed from an outer ink reservoir to a nozzle arrangement of the print head chip, wherein at least some of the storage channels and the feed channels have progressively decreasing cross-section towards the printhead chip.

According to an associated aspect of the invention, there is provided an apparatus for recording and generating images, the apparatus comprising
  a printing unit that comprises
  a carrier that is dimensioned to approximate a PCMCIA memory card, a media supply being receivable in the carrier;
  a page width print head assembly that is mounted in the carrier to print images on the media, the page width print head assembly including at least one print head chip and a suitable printing microprocessor that is configured to control operation of the print head chip;
  an ink supply mechanism that is operatively arranged with respect to the print head assembly to supply the print head assembly with ink; and
  a media feed mechanism positioned in the carrier to feed media to and from the print head chip; and
  an image recordal apparatus that comprises
  a housing in which the carrier is received, the housing being dimensioned to define a sleeve for the carrier so that at least half the carrier is received in the housing;
  an image sensing device that is positioned on the housing to sense an image to be generated; and
  an image sensing microprocessor that is positioned in the housing and is operatively arranged with respect to the image sensing device to control operation of the image sensing device;
wherein
  both the printing unit and the image recordal apparatus have complementary releasable data connectors so that the image sensing microprocessor can communicate image data to the printing microprocessor of the printing unit.

The invention is now described, by way of example, with reference to the accompanying drawings. It is to be noted that the following specific description is for the purposes of illustrating a particular embodiment of the invention and the manner in which it is to be performed and is not intended to limit the broad scope of the preceding summary.

DETAILED DESCRIPTION OF THE DRAWINGS

Figure 1:
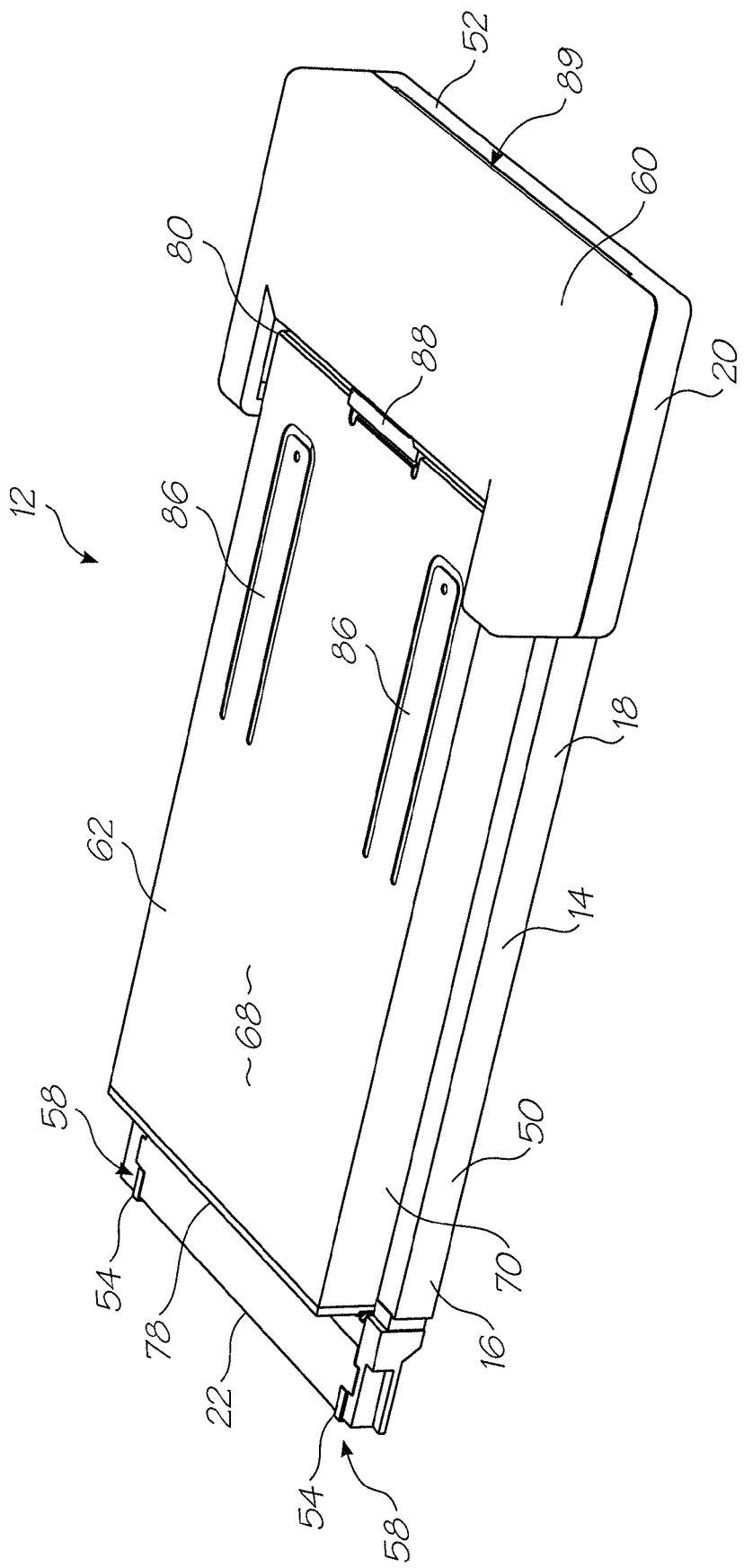
FIG. 1 shows a three dimensional view of a printing unit of an apparatus, in accordance with the invention, for recording and generating images.

In the drawings, reference numeral 10 generally indicates an apparatus, in accordance with the invention, for recording and generating images.

The apparatus 10 includes a printing unit 12. The printing unit 12 has a carrier 14 that is dimensioned so that the printing unit 12 is similar in size to a PCMCIA memory card. In particular, the printing unit 12 is similar in size to a PCMCIA type III card. As is known, PCMCIA is an acronym for Personal Computer Memory Card International Association that sets parameters for PC cards having various sizes. The PCMCIA type III card has a typical size of approximately 86 mm in length, approximately 54 mm in width and approximately 11 mm in thickness.

The carrier 14 includes an elongate, substantially rectangular support structure 16. The support structure 16 includes a body portion 18 with a tray 20 positioned at one end of the body portion 18 and a PCMCIA-type connector 22 positioned at an opposed end of the body portion 18. A print head assembly 24 is mounted on the tray 20. The print head assembly 24 includes a print head 26 that is positioned to span a printing region indicated generally at 28. The print head assembly 24 is shown in some detail in FIG. 4. The print head 26 includes at least one print head chip 27 that is the product of an integrated circuit fabrication technique. Furthermore, each print head chip is described in the above referenced U.S. patent application Ser. No. 09/425,419.

The print head 26 has an ink distribution arrangement 30 mounted thereon. The ink distribution arrangement 30 is described in U.S. patent application Ser. No. 09/922,105, which is incorporated herein by reference. The ink distribution arrangement 30 includes an ink storage and feed structure 29 in fluid communication with a channeling structure 31. The channeling structure 31 is in fluid communication with the print head chip 27 so that ink can be fed to the nozzle arrangements of the print head chip 27. The ink storage and feed structure 29 includes a pair of outer ink reservoirs 33 and a pair of rows of ink storage channels 35 positioned between the outer ink reservoirs 33.

Figure 4:
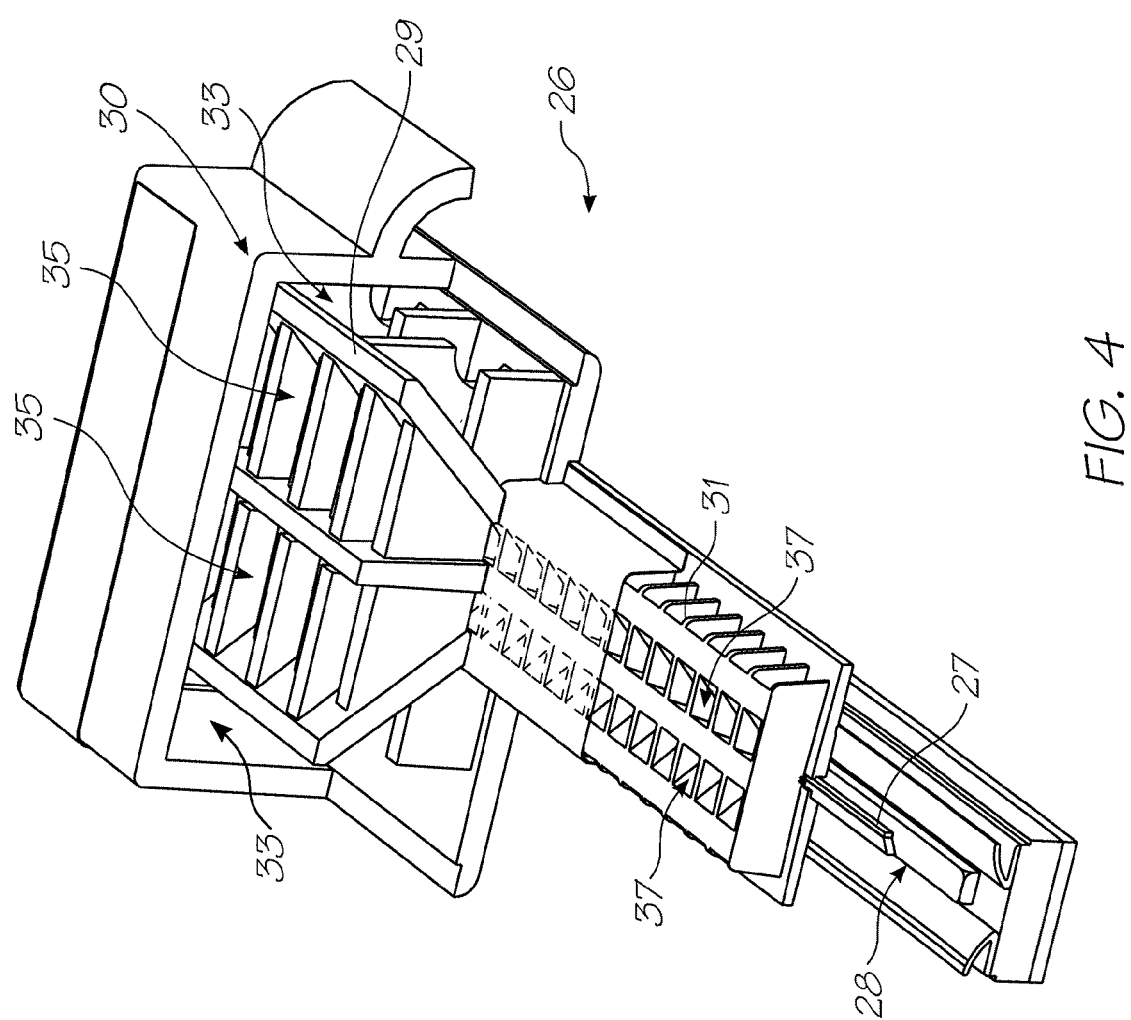
FIG. 4 shows a partly cut away view of a print head of the printing unit of FIG. 1.
Figure 5:
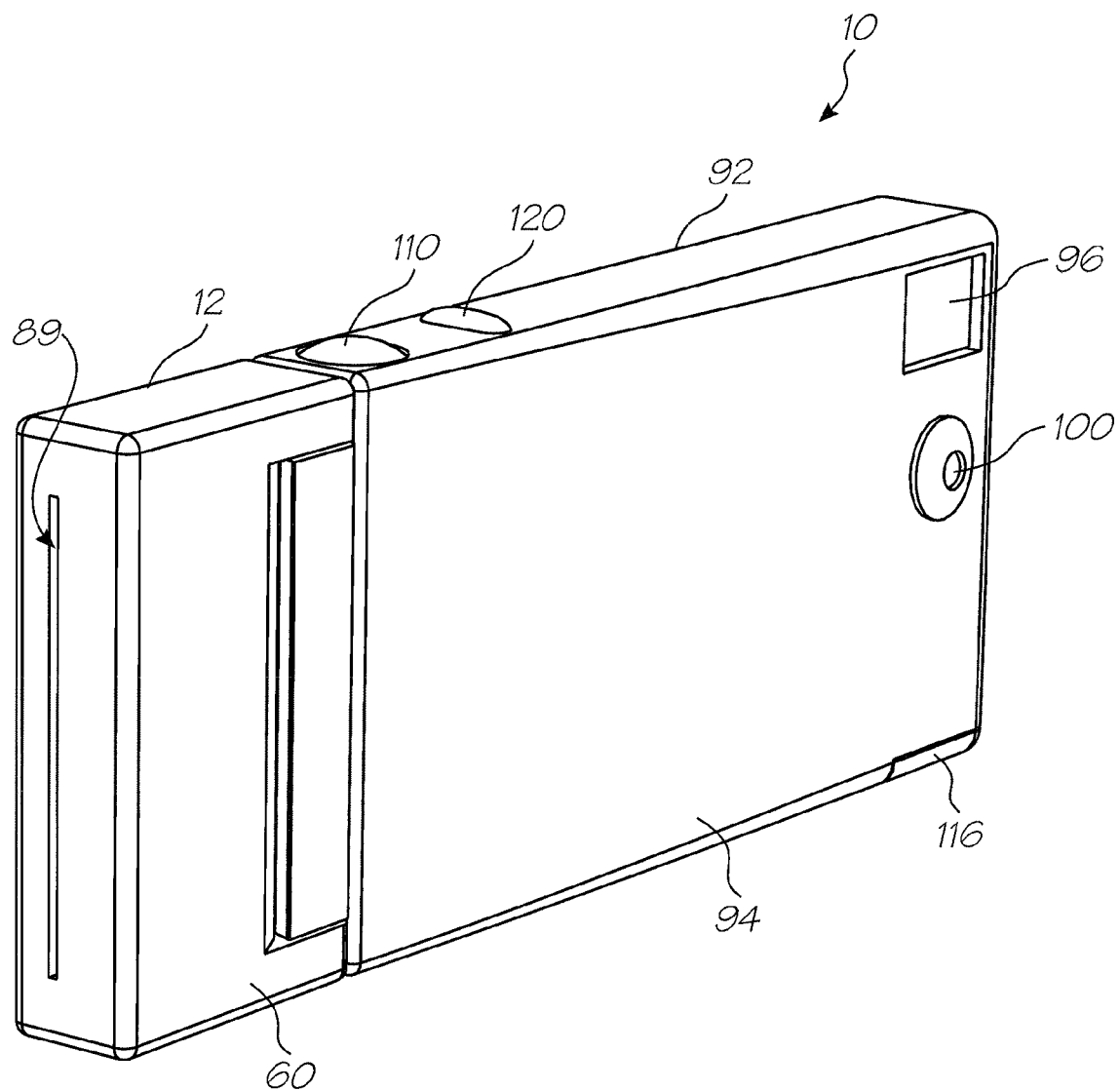
FIG. 5 shows a three dimensional view of the apparatus for recording and generating images.
Figure 6:
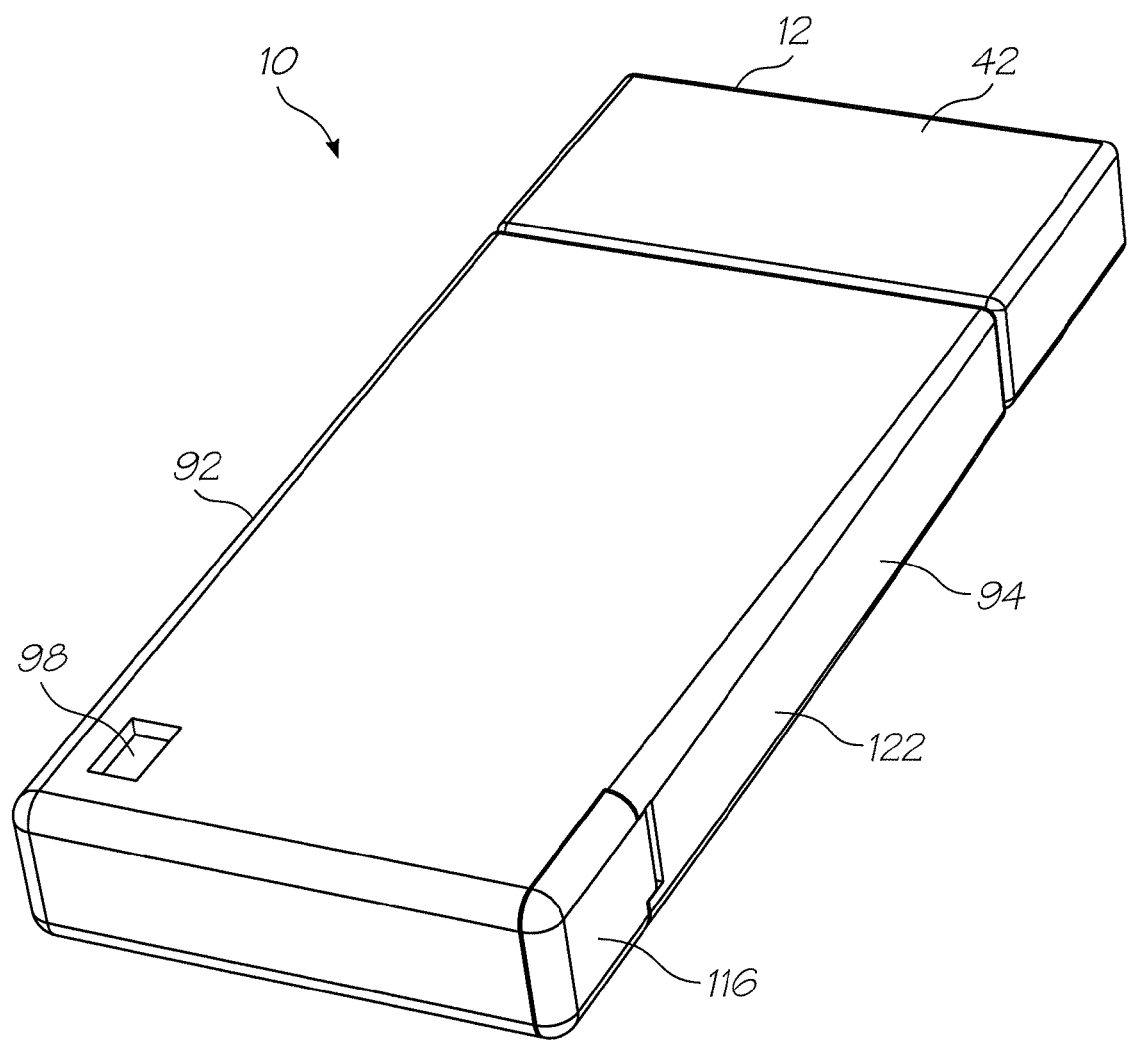
FIG. 6 shows a rear view of the apparatus of FIG. 5.
Figure 7:
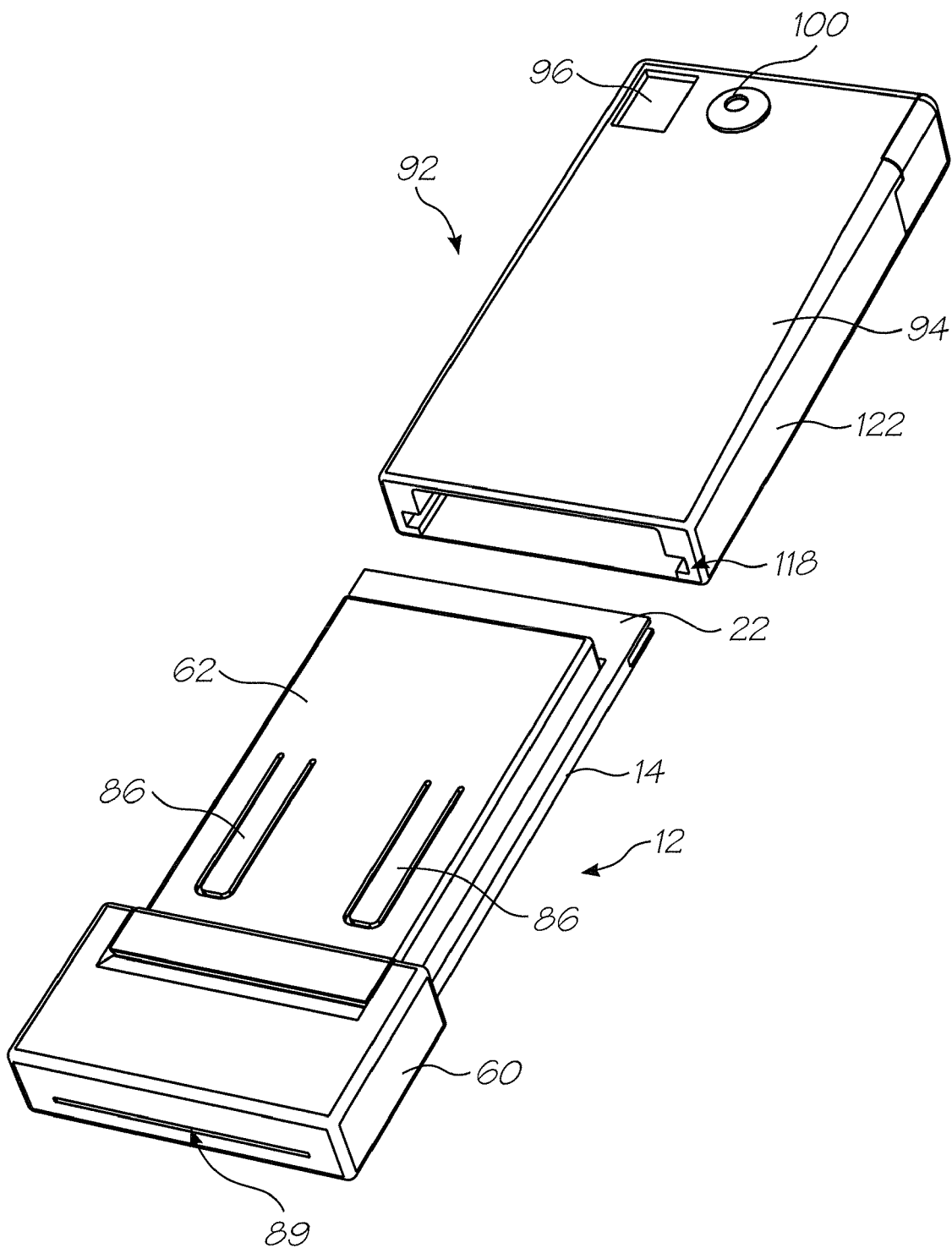
FIG. 7 shows the apparatus of FIG. 5 with the printing unit detached from an image recordal apparatus.
Figure 8:
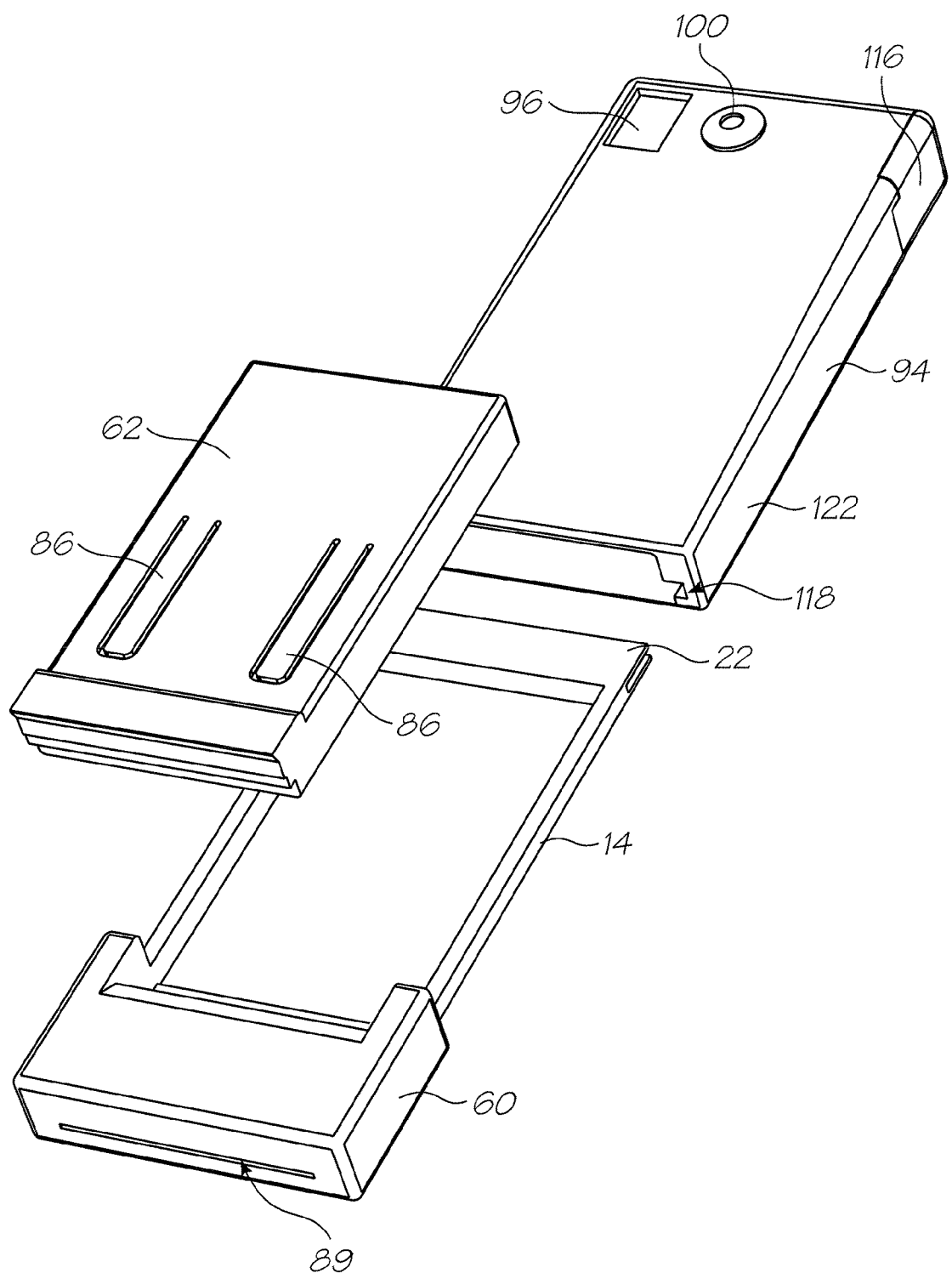
FIG. 8 shows the apparatus of FIG. 5 with a print media cartridge detached from the printing unit.
Figure 9:
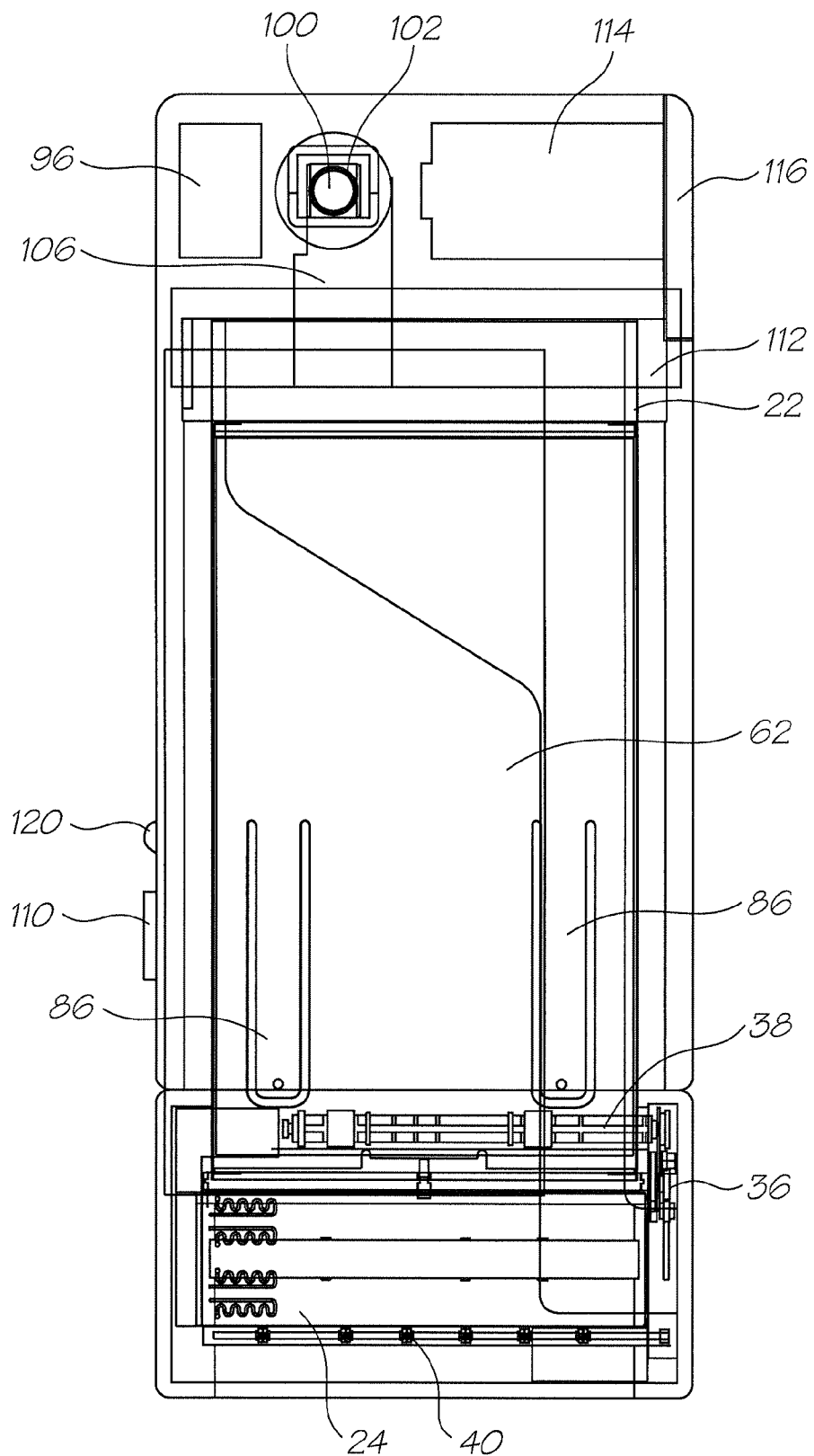
FIG. 9 shows a front view of the apparatus of FIG. 5, indicating the position of some of the components.
Figure 10:
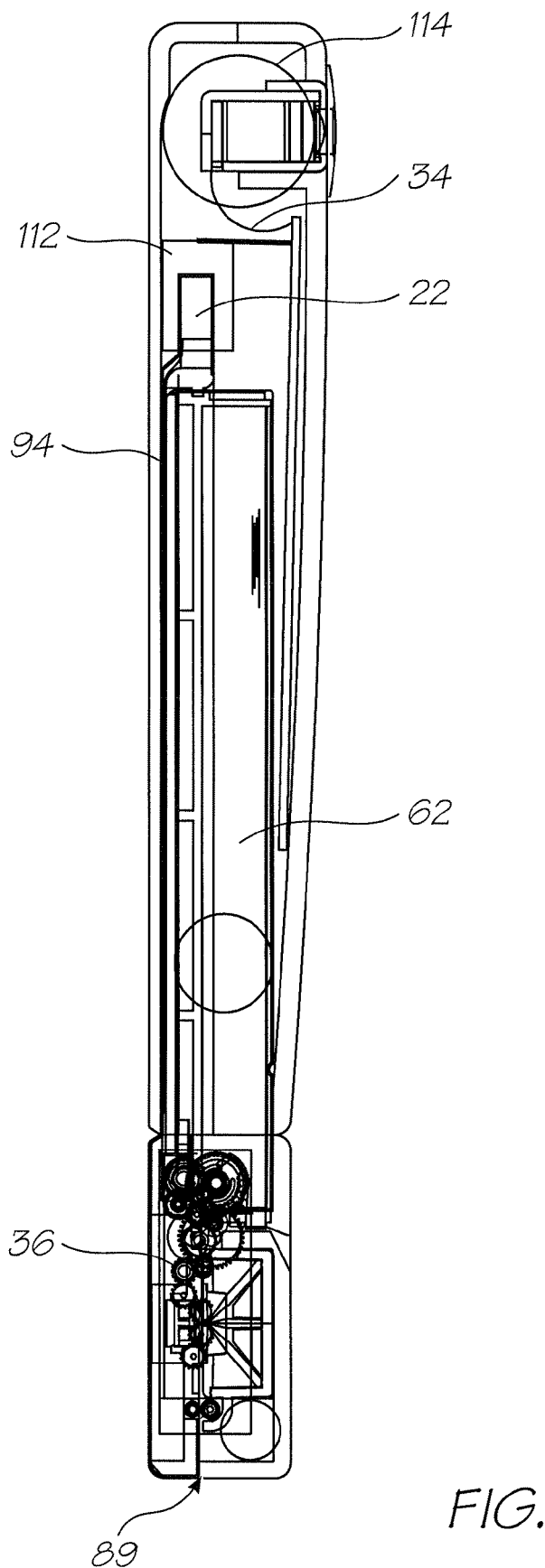
FIG. 10 shows a plan view of the apparatus of FIG. 5 also indicating the position of some of the components.

The channeling structure 31 includes a pair of rows of feed channels 37. Each feed channel 37 is in fluid communication with a respective storage channel 35. As can be seen in FIG. 4, the ink storage and feed structure 29 and the channeling structure 31 together define a plurality of ink feed passages that gradually decrease in cross sectional area as they near the print head chip 27.

The print head assembly 24 includes control circuitry in the form of a microprocessor 32, mounted on the tray 20. Details of a suitable microprocessor are provided in the above referenced U.S. patent application Ser. No. 09/113,053.

The print head assembly 24 further includes a motor 34 that is drivingly connected to a gearbox 36. Operation of the motor 34 and thus the gearbox 36 is also controlled by the microprocessor 32. A primary feed roller 38 is positioned on an infeed side of the printing region 28 and is connected to the gearbox 36 to be driven by the gearbox 36. A secondary feed roller 40 is positioned on an outfeed side of the printing region 28.

The support structure 16 includes a base member 42. The base member 42 includes a feed plate 44 that has a pair of opposed side clips 46 and a front clip 48 positioned thereon. The side clips 46 serve to engage side walls 50 of the body portion 18 and a front side 52 of the tray 20.

A pair of spaced retaining clips 54 are positioned on a rear side 56 of the feed plate 44 to engage complementary formations 58 defined on each side of the PCMCIA-type connector 22.

The printing unit 12 includes a cover member 60 that is mountable over the print head assembly 24 to protect the print head assembly 24.

Figure 2:
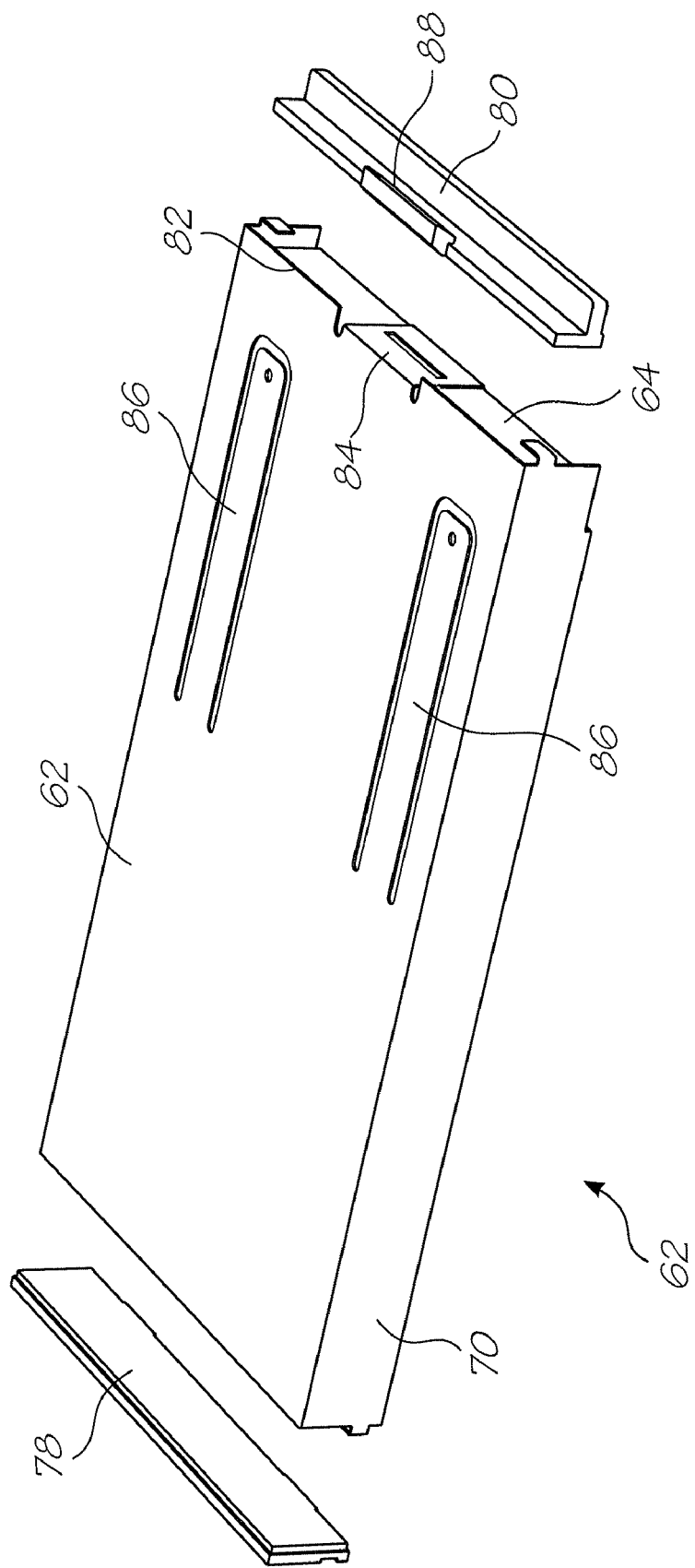
FIG. 2 shows a partially exploded view of a print media cartridge of the printing unit of FIG. 1.
Figure 3:
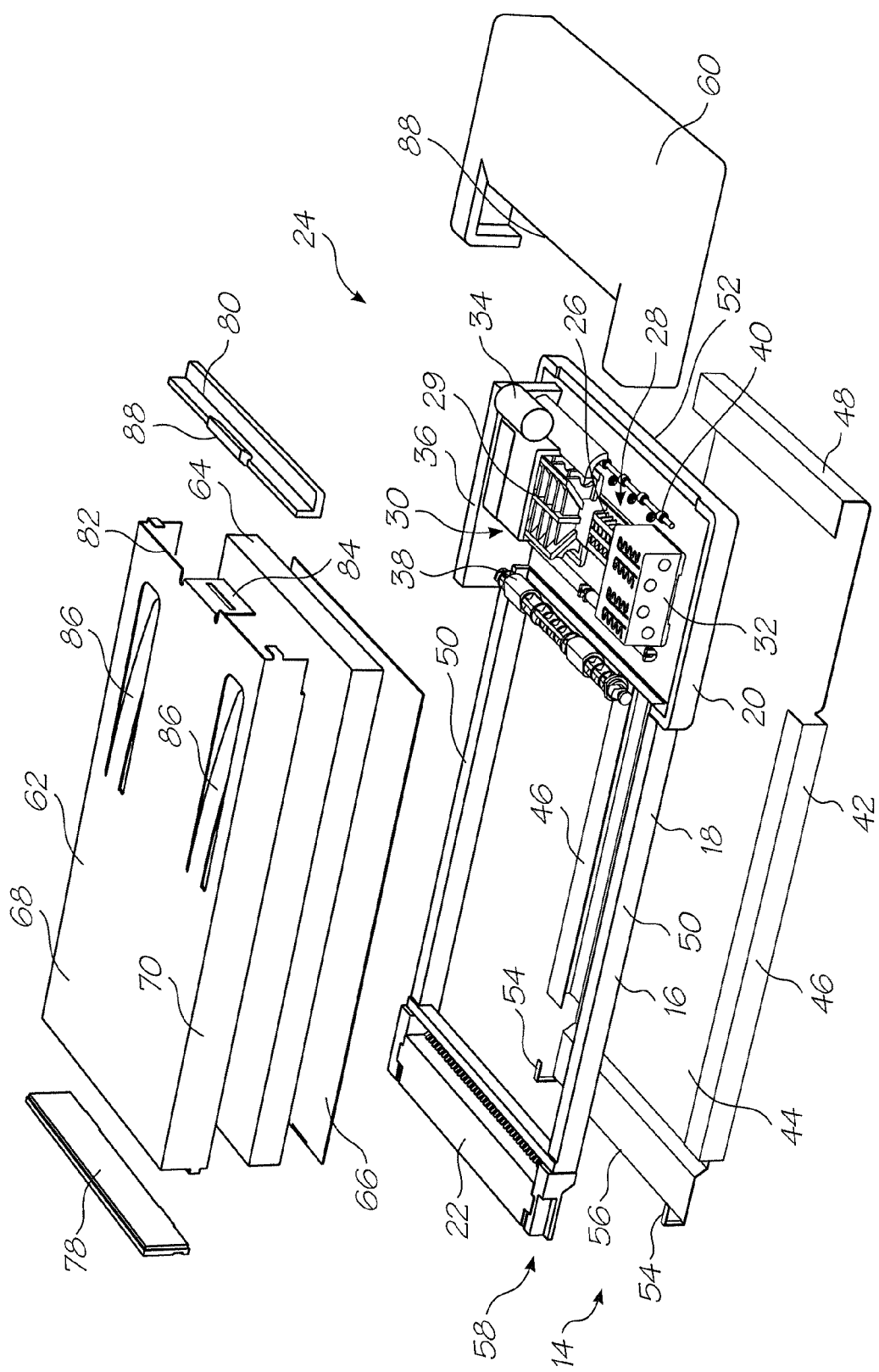
FIG. 3 shows an exploded view of the printing unit of FIG. 1.

A media supply cartridge in the form of a paper sheet cartridge 62 is mountable on the body portion 18. A supply 64 of paper sheets, one of which is indicated at 66, is receivable in the cartridge 62. The cartridge 62 includes a backing plate 68 against which the supply 64 is positioned, in use. Each of a pair of side walls 70 extends from a respective major side of the backing plate 68. A rear cover 78 is mounted on the backing plate 68 and the side walls 70. Further, a front cover 80 is also mounted on the backing plate 68 and the side walls 70. As can be seen in FIGS. 2 and 3, a retaining clip 84 is positioned on a feed end 82 of the backing plate 68. The retaining clip 84 is configured to retain the paper supply 64 in the cartridge 62 as the sheet 66 is fed from the supply 64 into the printing region 28.

The backing plate 68 defines a pair of urging members 86. The urging members 86 are biased so that when the supply 64 is positioned in the cartridge 62, the supply 64 is biased towards the feed plate 44. The front cover 80 and the cover member 60 have complementary engaging formations 88 which allow the cartridge 62 to be urged into engagement with the cover member 60. In this position, the primary feed roller 38 is positioned to engage the sheet 66 so that when the primary feed roller 38 rotates, the sheet 66 is drawn into the printing region 28. The cover member 60 and the tray 20 together define an outfeed slot 89 from which printed sheets are fed.

Figure 11:
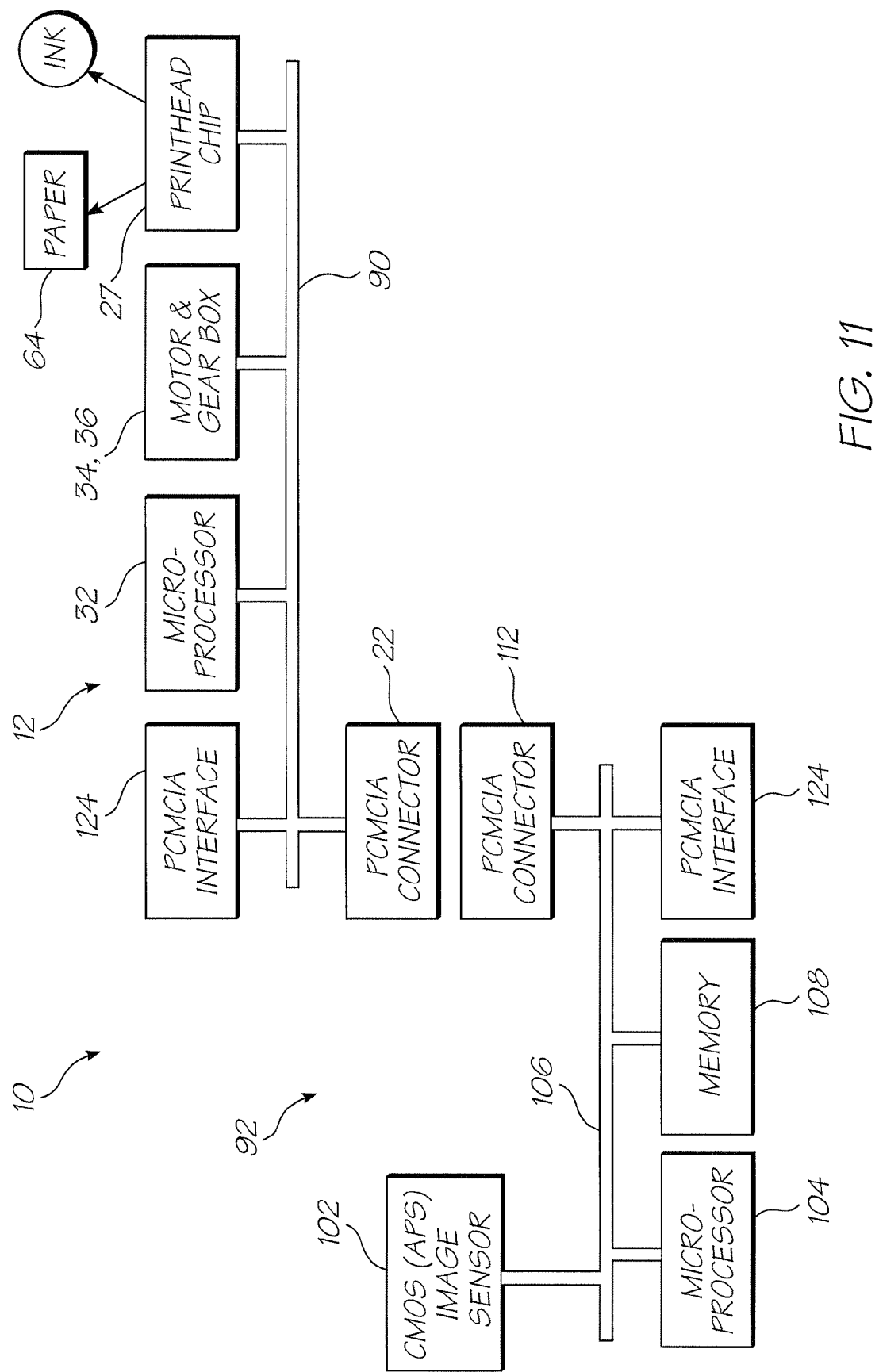
FIG. 11 shows a schematic block diagram indicating the various components of the apparatus of FIG. 5.

The various components of the printing unit 12 are indicated schematically in FIG. 11. As can be seen, the PCMCIA-type connector 22 is connected to the microprocessor 32 with a suitable data bus indicated at 90. The data bus 90 also serves to connect the microprocessor 32 to the print head 26. Thus, image data received by the PCMCIA-type connector 22 can be communicated to the microprocessor 32 which can then control operation of the print head 26 to generate an image on the paper sheet 66.

The apparatus 10 further includes an image recordal apparatus 92. The image recordal apparatus 92 includes a housing in the form of a sleeve 94 in which the printing unit 12 is received up to the cover member 60. As can be seen in the drawings, this means that approximately two thirds of the printing unit 12 is received in the sleeve 94. Further, the cover member 60 and its respective portion of the feed plate 44 is dimensioned to correspond, transversely, with transverse dimensions of the sleeve 94. It follows, therefore, that the apparatus 10 has overall dimensions that are in the region of one third larger than a type III PCMCA-type card. It will readily be appreciated that an article of this size can easily be carried in a pocket of a garment.

The image recordal apparatus 92 has a viewfinder 96 positioned thereon. The viewfinder 96 includes an eyepiece 98 through which a viewer can target an image to be recorded. A camera lens 100 is positioned proximate the viewfinder 96 and is configured to provide a focused image of that which is to be recorded. The camera lens 100 is positioned in front of a CMOS-based image sensing device that, in this example, is in the form of an active pixel sensor 102.

The active pixel sensor 102 is connected to a microprocessor 104 with a suitable data bus 106. The interaction of these components can readily be seen in FIG. 11.

The data bus 106 also serves to connect the active pixel sensor 102 to a memory storage device 108.

Operation of the image recordal apparatus is by way of a camera actuating button 110 that is depressed by a user in a conventional manner. The actuator button 110 is connected to the microprocessor 104 so that, upon actuation, the processor 104 communicates a command signal to the active pixel sensor 102 to capture the desired image. Data carrying this image is then stored in the memory storage device 108.

Operation of the printing unit 12 is by way of a printer actuating button 120 that is connected to the printing microprocessor 32. The microprocessor 32 actuates operation of the print head assembly 24 when the button 120 is depressed so that the recorded image can be printed.

Details of the operation of the image recordal apparatus are set out further in U.S. application Ser. No. 09/113,053, incorporated above. It follows that further details of the operation of the image recordal apparatus will not be described in this specification.

The image recordal apparatus 92 includes a complementary PCMCIA-type connector 112 that is positioned in the sleeve 94 to engage the PCMCIA-type connector 22 when the printing unit 12 is inserted into the image recordal apparatus 92.

The data bus 106 also serves to connect the microprocessor 104 and the memory storage device 108 to the complementary PCMCIA-type connector 112 so that data relating to the captured image can be sent to the microprocessor 32 of the printing unit 12.

Both the printing unit 12 and the image recordal apparatus 92 include a PCMCIA connector interface 124 to control the transfer of data across the PCMCIA-type connectors 22, 112.

A battery indicated at 114 received within the sleeve 94 provides energy for the operation of the various components of the apparatus 10. A battery cover 116 is provided to secure the battery 114 in the sleeve 94. Opposed minor side walls 122 of the sleeve 94 have guide formations 118 defined therein. The side walls 50 of the body portion 18 are slideably received in respective guide formations 118 to facilitate interconnection of the printing unit 12 and the image recordal apparatus 92.

The Applicant believes that the invention provides a means whereby a compact image recordal device or camera incorporating a printer can be achieved. In particular, the device is only between approximately 30 and 40 percent larger than a PCMCIA type III memory card. This has been perceived by the Applicant to be a significant advantage based on the popularity of pocket-sized cameras.

We claim:

1. A printing unit comprising:
    a support structure having a body portion with a tray positioned at one end of the body portion and a connector positioned at an opposite end of the body portion;
    a media supply cartridge located between the connector and a print head assembly, the cartridge mounted on the body portion for storing a stack of print media;
    a feed arrangement mounted on the body portion and configured to feed print media from the stack for printing; and
    the print head assembly mounted on the tray and configured to print on the fed print media.

2. A printing unit as claimed in claim 1, wherein the media supply cartridge has a backing plate against which the stack is positioned, the backing plate defining a pair of urging members for compressing the stack in use.

3. A printing unit as claimed in claim 1, wherein the print head assembly has a print head that is positioned to span a printing region, the print head having at least one print head integrated circuit.

4. A printing unit as claimed in claim 3, wherein the print head has an ink distribution arrangement mounted thereon, the ink distribution arrangement having an ink storage and feed structure in fluid communication with a channeling structure, the channeling structure being in fluid communication with the print head integrated circuit so that ink can be fed to nozzle arrangements of the print head integrated circuit.

5. A printing unit as claimed in claim 4, wherein the ink storage and feed structure includes a pair of outer ink reservoirs and a pair of rows of ink storage channels positioned between the outer ink reservoirs.

6. A printing unit as claimed in claim 1, wherein the feed arrangement includes a roller rotationally mounted to the body.

7. A printing unit as claimed in claim 1, wherein the connector is a PCMCIA-type connector and the printing unit is of a similar size to a PCMCIA memory card.

8. A printing unit as claimed in claim 1, in which a protective cover member is mountable over the printhead assembly.

* * * * *